United States Patent
Zhang et al.

(10) Patent No.: US 11,150,712 B2
(45) Date of Patent: Oct. 19, 2021

(54) SMART CONTROLLER WITH PHANTOM INDUCTOR CURRENT SENSING FOR SWITCHED MODE POWER SUPPLIES

(71) Applicant: International Business Machines Corporation, Armonk, NY (US)

(72) Inventors: Xin Zhang, Yorktown Heights, NY (US); Todd E. Takken, Brewster, NY (US); Andrew Ferencz, Southborough, MA (US); Leland Chang, New York, NY (US); Paul W. Coteus, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 381 days.

(21) Appl. No.: 16/399,981

(22) Filed: Apr. 30, 2019

(65) Prior Publication Data
US 2020/0348740 A1    Nov. 5, 2020

(51) Int. Cl.
G06F 1/28      (2006.01)
H02M 1/08      (2006.01)
H02M 3/156     (2006.01)
H02M 1/00      (2006.01)

(52) U.S. Cl.
CPC .............. G06F 1/28 (2013.01); H02M 1/08 (2013.01); H02M 3/156 (2013.01); *H02M 1/0009* (2021.05)

(58) Field of Classification Search
CPC ......... G06F 1/28; H02M 1/08; H02M 1/0009; H02M 3/156

USPC ......................................................... 713/340
See application file for complete search history.

(56) References Cited

U.S. PATENT DOCUMENTS

| | | | |
|---|---|---|---|
| 5,212,373 A | 5/1993 | Fujioka et al. |
| 5,982,160 A | 11/1999 | Walters et al. |
| 6,160,388 A | 12/2000 | Skelton et al. |
| 6,441,597 B1 | 8/2002 | Lethellier |

(Continued)

OTHER PUBLICATIONS

Vijay V. Kondalkar, Development of chipless, wireless current sensor system based on giant magnetoimpedance magnetic sensor and surface acoustic wave transponder, Natre. Scientific RePorTS | (2018) 8:2401 | DOI: 10.1038/s41598-018-20867-3 Published: Online Feb. 5, 2018 pp. 1-11.

(Continued)

*Primary Examiner* — Tomi Skibinski
(74) *Attorney, Agent, or Firm* — Daniel Morris; Otterstedt, Wallace & Kammer, LLP

(57) ABSTRACT

Voltage on the output terminal of an inductor is obtained as a first input signal to a control block (CB); the inductor has an input terminal connected to a power switch and driver block at a switching node. A sense input voltage is obtained on an output terminal of a sensing circuit that is not directly connected to the switching node, as a second input signal to the CB. A voltage is generated on a first output terminal of the CB and is selected such that the CB can use its first and second input signals to infer the current through the inductor. A pulse width modulation (PWM) signal is generated on a second output terminal of the CB, based on the inferred current through the inductor; the second output signal from the CB is provided to a PWM input terminal of the power switch and driver block.

20 Claims, 13 Drawing Sheets

(56) References Cited

U.S. PATENT DOCUMENTS

| | | |
|---|---|---|
| 6,624,671 B2 | 9/2003 | Fotouhi |
| 7,060,977 B1 | 6/2006 | Dupeyrat et al. |
| 7,061,648 B2 | 6/2006 | Nakajima et al. |
| 8,674,672 B1 | 3/2014 | Johal et al. |
| 8,836,304 B2 * | 9/2014 | Sheng .................. H02M 3/156 323/282 |

OTHER PUBLICATIONS

Wireless Current Sensor—PS-3212, Online Article. Pasco. Downloaded From https://www.pasco.com/?prodCatalog/PS/PS-3212_wireless-current-sensor/index.cfm) At Least as Early As Aug. 30, 2018 p. 1 of 1.

Wikipedia, IBM eFUSE, downloaded from https://en.wikipedia.org/wiki/IBM_eFUSE Mar. 16, 2019 pp. 1-2.

* cited by examiner

SMART CONTROLLER WITH PHANTOM INDUCTOR CURRENT SENSING FOR SWITCHED MODE POWER SUPPLIES

STATEMENT REGARDING FEDERALLY SPONSORED RESEARCH OR DEVELOPMENT

This invention was made with Government support under Contract No.: B621073 awarded by the Department of Energy. The Government has certain rights in this invention.

BACKGROUND

The present invention relates to the electrical, electronic, and computer arts, and more specifically, to power supplies and the like.

Current sensing is a pertinent function in switched-mode power supplies. It is used in current mode controlled power supplies to perform closed loop voltage regulation. In multiphase converters, where the phases share load current, current sensing is used to balance thermal stress on each phase. This is referred to as "current sharing and balancing." Regardless of the type of feedback control, multiple types of DC-DC power supplies sense the inductor current for over-current protection.

FIG. 1 illustrates a conventional current sensing scheme in a switched-mode power supply (buck converter in this example). Element 102 depicts the power switches with an input voltage $V_{IN}$ and a ground connection. Element 104 is the power inductor, which is represented as an ideal inductor L 104a and its parasitic DC resistance $R_L$ 104b. Element 114 is an output filtering capacitor in parallel with the load 116 between output voltage $V_{OUT}$ and ground. Element 118 is a controller with a supply voltage $V_{DD}$ and a ground connection. Note the sensing resistor $R_S$ numbered 106 and the sensing capacitor $C_{S1}$ numbered 108. The node 124 has voltage $V_{sense1}$ which is the sense input to the controller 118. A pulse width modulation (PWM) signal $V_{PWM}$ is generated by controller 118 to control power switches 102. The left-hand terminal of resistor $R_S$ numbered 106 is connected to switching node $V_{SW1}$. The right-hand terminal of capacitor $C_{S1}$ numbered 108 is connected to $V_{OUT}$.

The conventional current sensing technique of FIG. 1 uses a filter including the current sensing resistor $R_S$ numbered 106 and the current sensing capacitor $C_{S1}$ numbered 108 in parallel with the converter's output inductor 104 to sense the current in the inductor. This conventional current sensing technique requires a connection 109 from the switching node $V_{SW1}$ of the power switches to the sensing resistor $R_S$ numbered 106, which is usually an external wire on a printed circuit board, or a long metal wire in an integrated circuit chip.

SUMMARY

Principles of the invention provide techniques for a smart controller with phantom inductor current sensing for switchmode power supplies. In one aspect, an exemplary apparatus includes a power switch and driver block having an input voltage terminal, a ground terminal, a pulse width modulation input terminal, and a switching node output; an inductor having an input terminal coupled to the switching node output and having an output terminal; a sensing capacitor having a first terminal coupled to the output terminal of the inductor and a second, sense input terminal; and a sensing resistor having a first terminal coupled to the second, sense input terminal of the sensing capacitor, and a second terminal including a pulse signal node. Also included is a control block having a voltage supply rail, a ground rail, a first input terminal coupled to the output terminal of the inductor, a second input terminal coupled to the second, sense input terminal of the sensing capacitor, a first output terminal coupled to the pulse signal node, and a pulse width modulation output terminal coupled to the pulse width modulation input terminal of the power switch and driver block. The control block includes correlative logic which generates a voltage on the first output terminal equivalent to a voltage of the switching node output so as to infer a current through the inductor, and the control block generates a pulse width modulation signal on the pulse width modulation output terminal, based on the inferred current through the inductor, without a direct electrical connection between (i) the sensing capacitor and the sensing resistor, and (ii) the switching node output of the power switch and driver block.

In another aspect, an exemplary method includes obtaining, as a first input signal to a control block, a voltage associated with an inductor having an input terminal and an output terminal, the input terminal being coupled to a power switch and driver block at a switching node, and the associated voltage being other than a voltage of the switching node. Further steps include obtaining, as a second input signal to the control block, a sense input voltage on an output terminal of a sensing circuit that is not directly connected to the switching node; generating a voltage on a first output terminal of the control block, the generated voltage being selected so as to enable inferring a current through the inductor; generating a pulse width modulation signal on a pulse width modulation output terminal of the control block, based on the inferred current through the inductor; and providing the pulse width modulation signal to a pulse width modulation input terminal of the power switch and driver block.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

Elements of one or more embodiments of the invention can be implemented in the form of a computer program product including a computer readable storage medium with computer usable program code for performing the method steps indicated. Furthermore, elements of one or more embodiments of the invention can be implemented in the form of a system (or apparatus) including a memory, and at least one processor that is coupled to the memory and operative to perform exemplary method steps. Yet further, in another aspect, elements of one or more embodiments of the invention can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

reduced number of connections required by the power switches, which is important, for example, when the power switches are on a different structure than the controller;

reduced pin count on the power switch structure (when the power switches and the inductor are on separate structures, in the conventional method, the sensing line should be connected to the switch in order to include the connector parasitic inductance as part of the output inductance—that requires an additional pin for the sensing line at the interface between the power switches and the controller);

removal of sensing line between the power switches and current sensing resistor (when the power switches and the controller are on the same integrated circuit chip, there is no limit on the number of pins between them—but if the sensing line needs to be connected from the power switches to the current sensing resistor, the line is a long metal line on the integrated circuit chip, which is subject to noise coupling);

location of the sensing resistor, sensing capacitor, and the controller physically close together (or physically on the same integrated circuit chip), and close the load—therefore it is possible to have a smaller delay in the feedback loop and a quicker response in regulating the load voltage, as compared to the conventional method which has a larger delay in the current sensing loop.

These and other features and advantages of the present invention will become apparent from the following detailed description of illustrative embodiments thereof, which is to be read in connection with the accompanying drawings.

DETAILED DESCRIPTION

One or more embodiments advantageously eliminate the connection 109 between the current sensing resistor 106 and the power switches 102. In one or more embodiments, a phantom switching signal is generated by the controller (e.g. pulse calibration circuit in the controller) to enable virtual sensing of the inductor current. This virtual inductor current is sensed as a voltage signal and then used by a closed loop control circuit to perform closed loop control of the switched-mode power supply, or can be used for current balance control among multiple converter phases, or can be used for current sensing.

Figure 1:
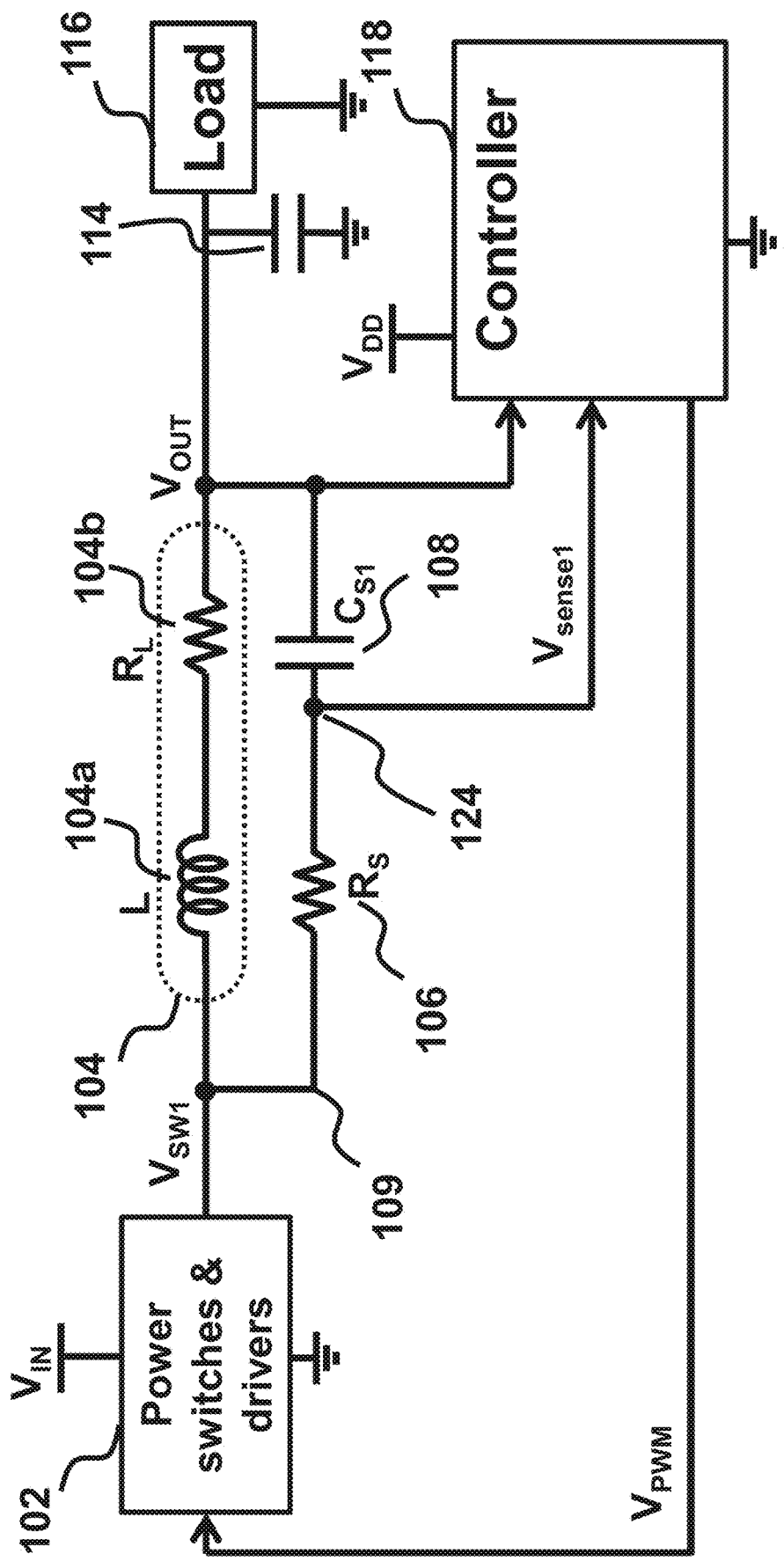
FIG. 1 illustrates shows a conventional current sensing scheme in a switched-mode power supply, in accordance with the prior art.
Figure 2:
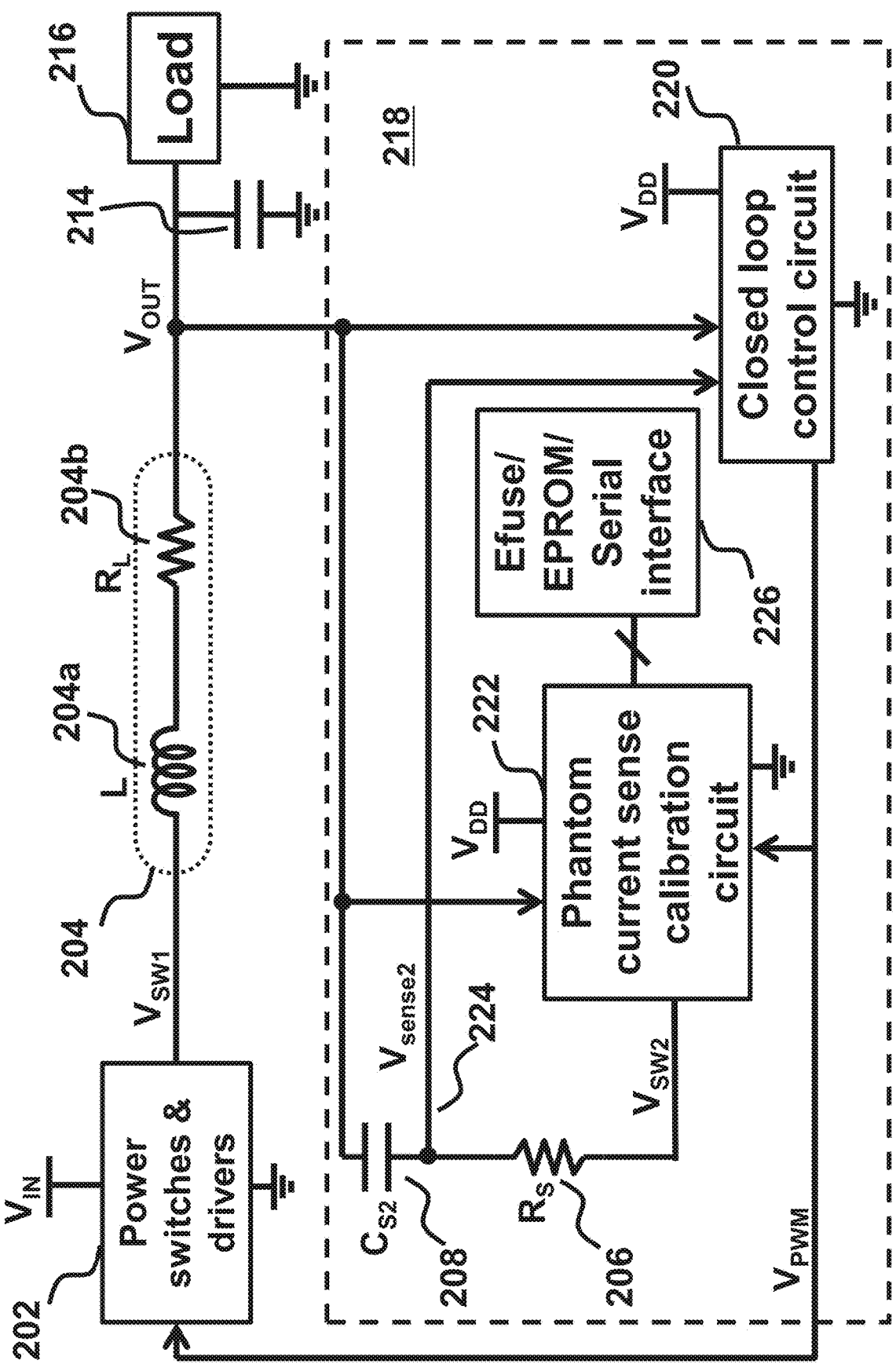
FIG. 2 illustrates a current sensing scheme, in accordance with an aspect of the invention.

FIG. 2 shows an exemplary embodiment of a circuit according to an aspect of the invention. Elements 202, 204, 204a, 204b, 214, and 216 are analogous to elements 102, 104, 104a, 104b, 114, and 116 in FIG. 1, and the voltages $V_{SW1}$ and $V_{OUT}$ are analogous in each figure. The dotted line enclosed region 218 represents a controller chip. In the exemplary embodiments, sense resistor $R_S$ 206 is not connected to node $V_{SW1}$ of the power switches 202 as compared to the prior-art arrangement depicted in FIG. 1, but is instead connected to node $V_{SW2}$ of phantom current sense calibration circuit 222. A signal $V_{SW2}$ is generated by circuit 222 to stimulate the sensing resistor 206 and the sensing capacitor $C_{S2}$ 208. $V_{SW2}$ is generated by circuit 222 as a duplicate of $V_{SW1}$. Both $V_{SW2}$ and $V_{SW1}$ are pulse signals in the exemplary embodiment and they have the same duty cycle, which is determined by the controller 218. Timing differences between $V_{SW2}$ and $V_{SW1}$ should preferably be minimized and much smaller than one clock cycle. Node 224 is the node whose voltage $V_{sense2}$ is the sense input to the controller. A pulse width modulation (PWM) signal $V_{PWM}$ is generated by closed loop control circuit 220 to control power switches 202. An eFuse/EPROM/Serial interface block 226 is used to store the calibration results from the calibration process. The Phantom current sense calibration circuit 222 carries out the calibration of parameters, adjusting the relationship between $V_{SW2}$ and $V_{PWM}$, in order to minimize $\Delta V_{OUT}$. Circuits 222 and 220 each have a voltage supply $V_{DD}$ and a ground connection. As will be appreciated by the skilled artisan, eFuse is a technology invented by IBM which allows for the dynamic real-time reprogramming of computer chips, wherein a chip manufacturer can allow for the circuits on a chip to change while it is in operation by "blowing" one or more eFuses.

FIG. 2 thus depicts current sensing for a buck converter (or other switched-mode power supply), in accordance with an embodiment of the invention. Note that $R_S$ numbered 206 is not connected to $V_{SW1}$, but rather back to the controller $V_{SW2}$. Node $V_{SW2}$ in FIG. 2 is a new node as compared to the prior art approach of FIG. 1. The embodiment of FIG. 2 thus eliminates the connection of $R_S$ to the power switches and drivers and integrates it instead into the controller 218. The dotted box 218 represents the controller including resistor $R_S$ numbered 206 and capacitor $C_{S2}$ numbered 208. Note also within controller 218 the phantom current sense calibration circuit 222, the memory/serial interface 226, and the closed loop control circuit 220 to control the current sensing conversion scheme.

Figure 3:
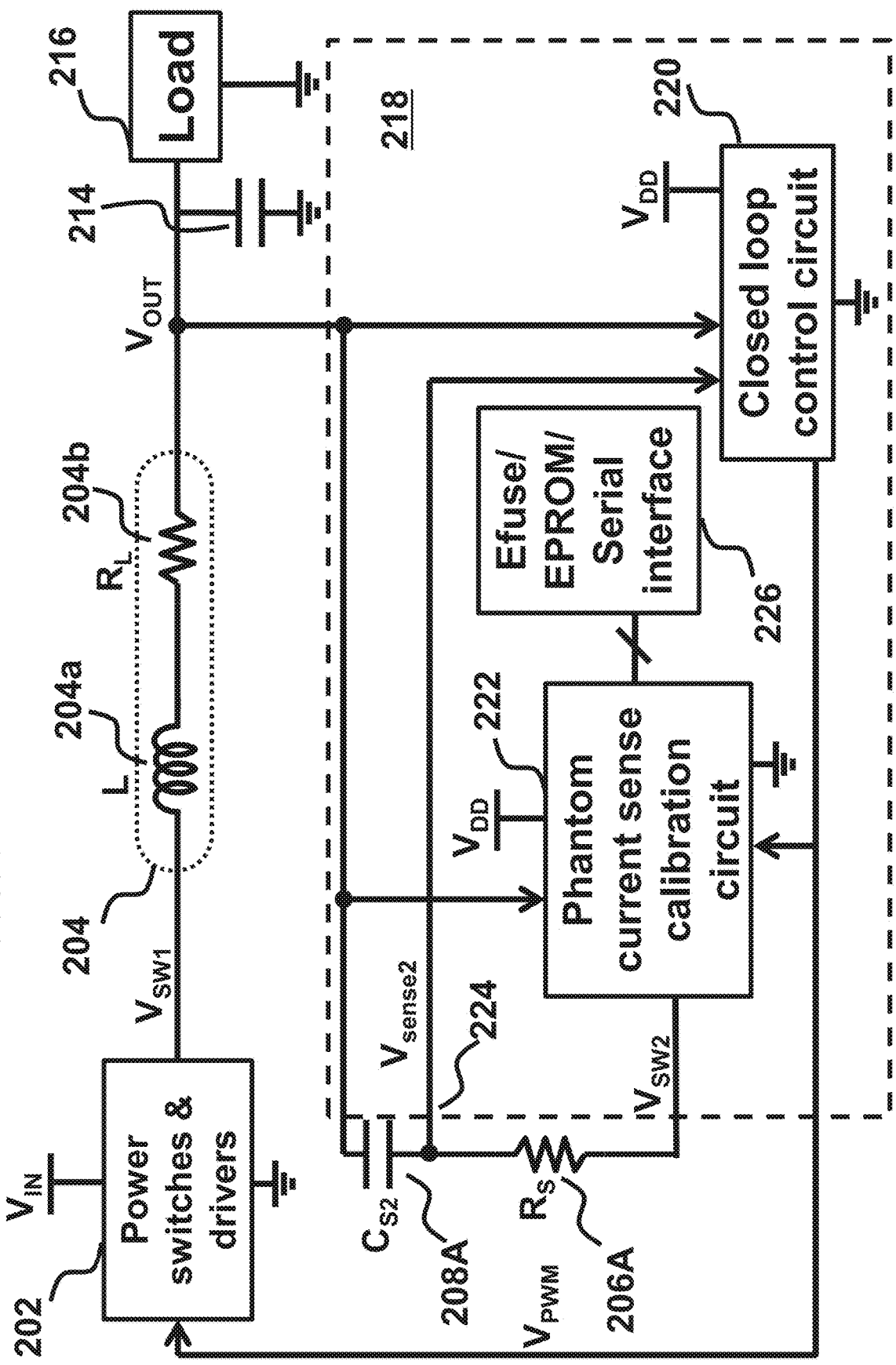
FIG. 3 illustrates a current sensing scheme, in accordance with another aspect of the invention.

FIG. 3 is identical to FIG. 2, except that resistor 206A and capacitor 208A are discrete components external to the controller chip 218 (and thus shown outside the dotted box), instead of integrated on the chip as are resistor 206 and capacitor 208 in FIG. 2.

Figure 4:
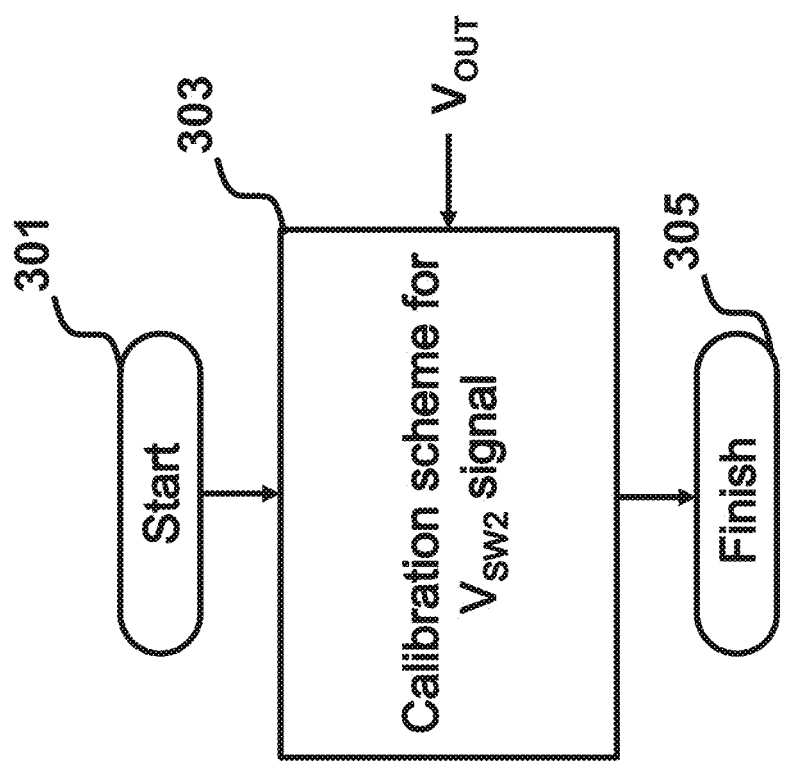
FIG. 4 illustrates a flow chart of calibration sequence of a pulse calibration circuit, in accordance with an aspect of the invention.

FIG. 4 shows a high-level flow chart of an exemplary calibration sequence of the phantom current sense calibration circuit 222. In order to calibrate the pulse signal $V_{SW2}$, the output voltage $V_{OUT}$ is monitored and used as an input to the calibration process. The flow chart begins at 301; calibration takes place at 303 with $V_{OUT}$ as an input, and the process concludes at 305.

Figure 5:
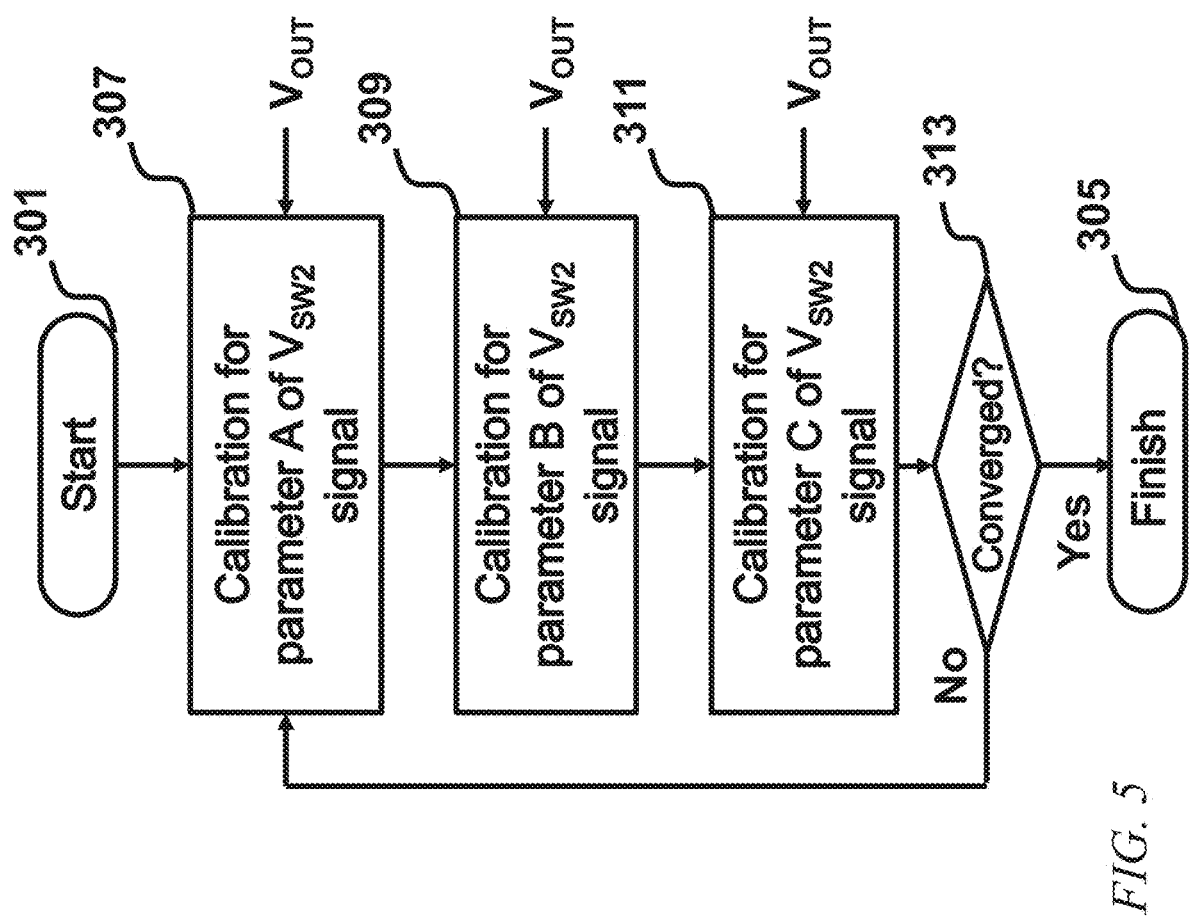
FIG. 5 illustrates one possible sequence for performing the calibration shown in FIG. 4, in accordance with an aspect of the invention.

FIG. 5 shows one possible non-limiting exemplary sequence of how to perform the calibration as shown in FIG. 4. Several parameters can be calibrated in one or more embodiments; e.g., Parameter A, Parameter B, Parameter C, and so on, until convergence is reached. Start and end blocks 301, 305 in FIG. 5 have received the same reference character as in FIG. 4, it being understood that the high-level process in FIG. 4 can be accomplished by other techniques besides the example in FIG. 5. Assume for illustrative purposes that there are three parameters, A, B, and C, which need to be calibrated. These parameters are calibrated by the sequence shown at 307, 309, 311. Once the result has converged, the calibration is finished. With regard to the latter aspect, in decision block 313, determine whether convergence has occurred; if not (NO branch) return to step 307; if the process has converged (YES branch) then it has finished as per 305.

Figure 6:
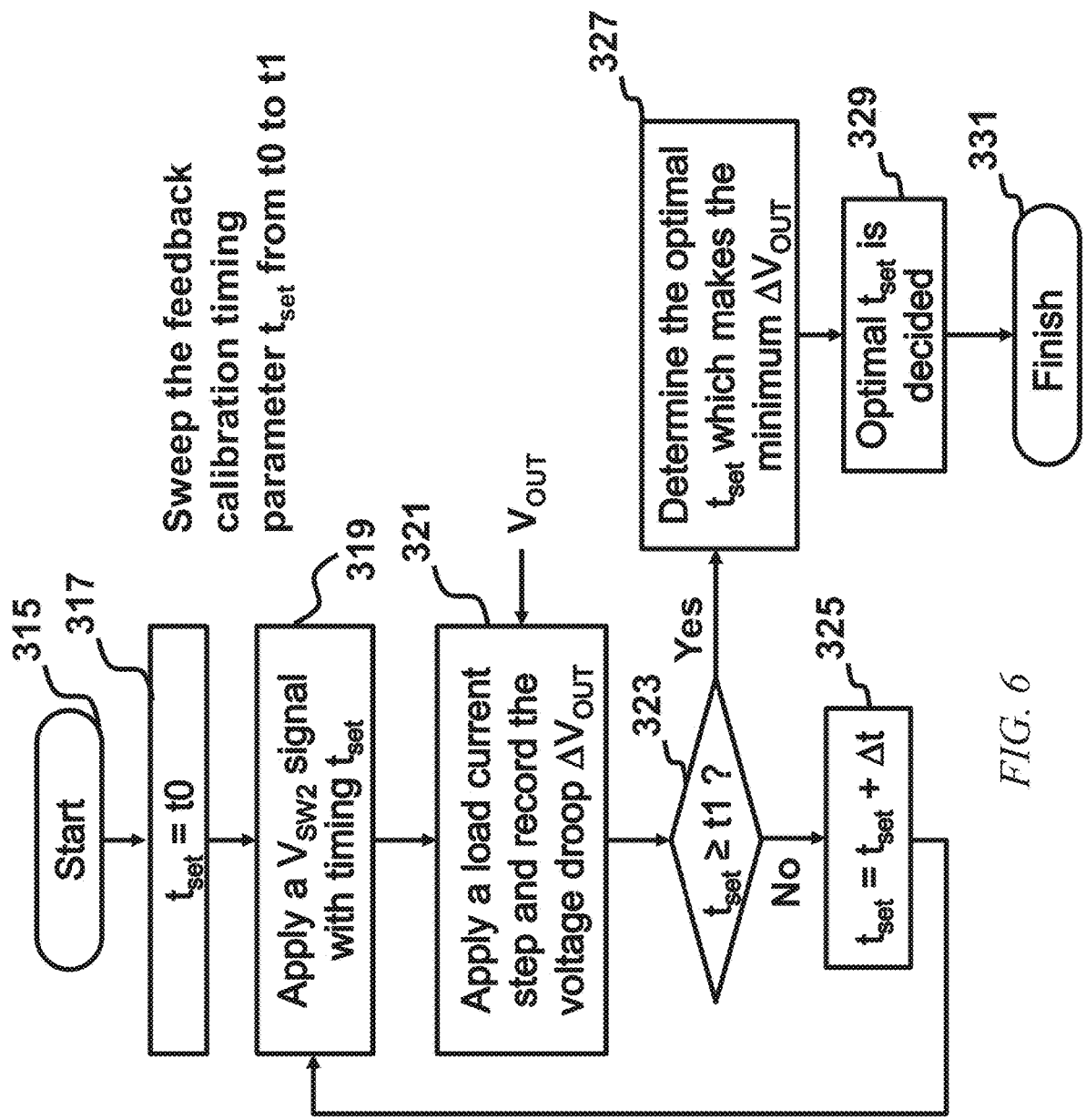
FIG. 6 illustrates one example of a calibration sequence of a timing parameter, in accordance with an aspect of the invention.

FIG. 6 shows one example of a calibration sequence of one parameter; the timing parameter $t_{set}$ (timing setting of the signal $V_{SW2}$). The process in FIG. 6 could correspond, for example, to blocks 307, 309, or 311 in FIG. 5. FIG. 6 thus presents a non-limiting particular example of a calibration scheme. After beginning at 315, in step 317, set $t_{set}=t_0$. Then, sweep the feedback calibration timing parameter $t_{set}$ from $t_0$ to $t_1$. In step 319, apply a $V_{SW2}$ signal with timing $t_{set}$ and then, in step 321, apply a load current step and record the voltage droop $\Delta V_{OUT}$. That is to say, measure $V_{OUT}$ and record the decrease (droop) in the output voltage when the load current is applied. Then, in decision block 323, compare $t_{set}$ to $t_1$. If $t_{set}$ is smaller than $t_1$ (NO branch), increase $t_{set}$ in step 325 and go back to step 319. If $t_{set}$ is greater than or equal to $t_1$ (YES branch), then, in step 327, determine the optimal $t_{set}$ which minimizes $\Delta V_{OUT}$. The optimal $t_{set}$ is thus decided, as per step 329, and the process concludes at 331.

Figure 7:
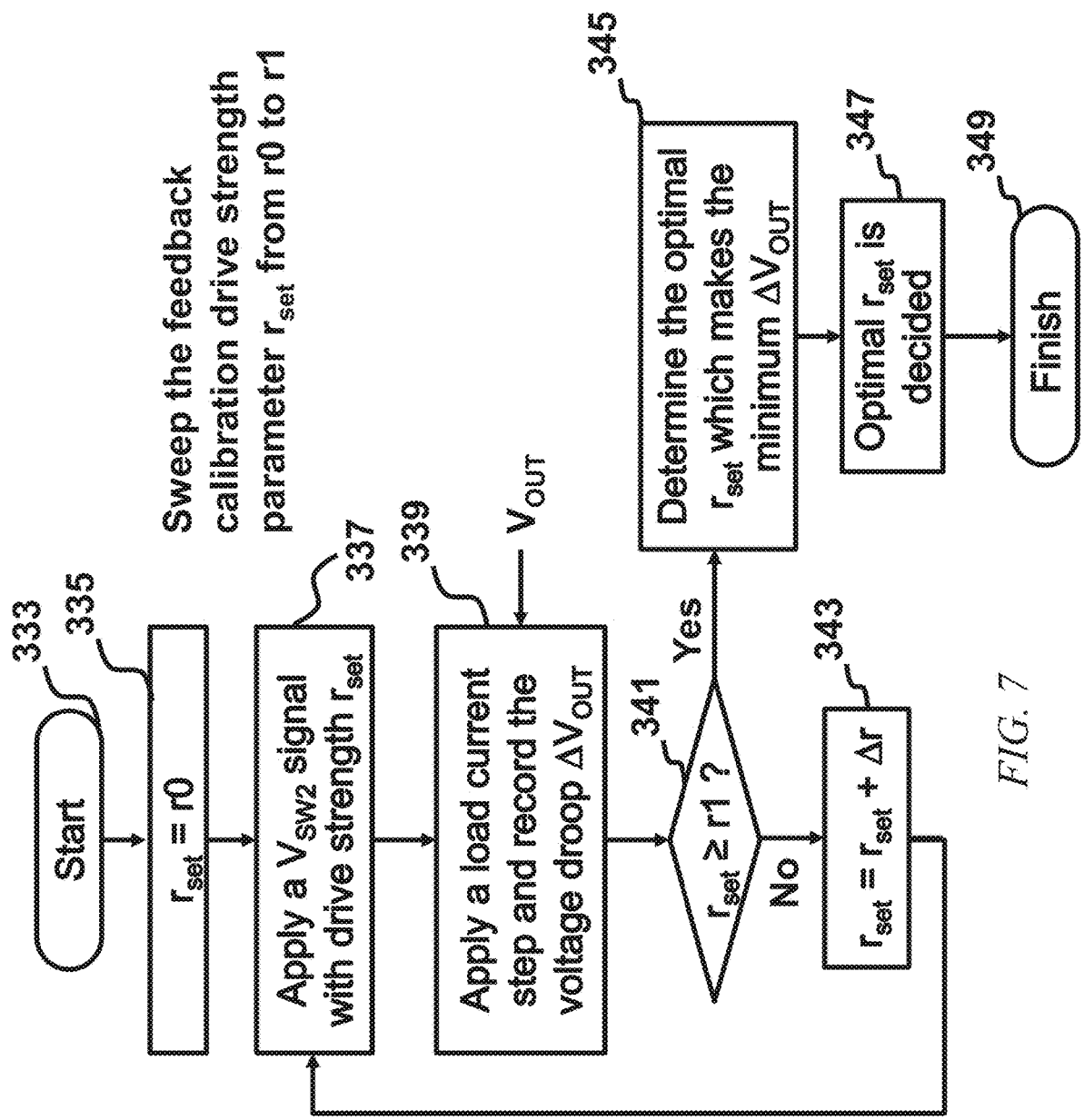
FIG. 7 illustrates one example of a calibration sequence of a drive strength parameter, in accordance with an aspect of the invention.

FIG. 7 shows another example of a calibration sequence of one parameter; the drive strength parameter $r_{set}$ (drive strength of the signal $V_{SW2}$). The process in FIG. 7 could correspond, for example, to blocks 307, 309, or 311 in FIG. 5. FIG. 7 thus presents another non-limiting particular example of a calibration scheme, for the parameter $r_{set}$. This parameter refers to the drive strength of the power switch. The calibration is performed in a similar way to that in FIG. 6; just the parameter is different. Thus, begin at 333, and, at step 335, set $r_{set}=r_0$. Then, sweep the feedback calibration drive strength parameter $r_{set}$ from $r_0$ to $r_1$. In step 337, apply a $V_{SW2}$ signal with drive strength $r_{set}$ and then, in step 339, apply a load current step and record the voltage droop $\Delta V_{OUT}$. That is to say, measure $V_{OUT}$ and record the decrease (droop) in the output voltage when the load current is applied. Then, in decision block 341, compare $r_{set}$ to $r_1$. If $r_{set}$ is smaller than $r_1$ (NO branch), increase $r_{set}$ in step 343 and go back to step 337. If $r_{set}$ is greater than or equal to $r_1$ (YES branch), then, in step 345, determine the optimal $r_{set}$ which minimizes $\Delta V_{OUT}$. The optimal $r_{set}$ is thus decided, as per step 347, and the process concludes at 349.

Figure 8:
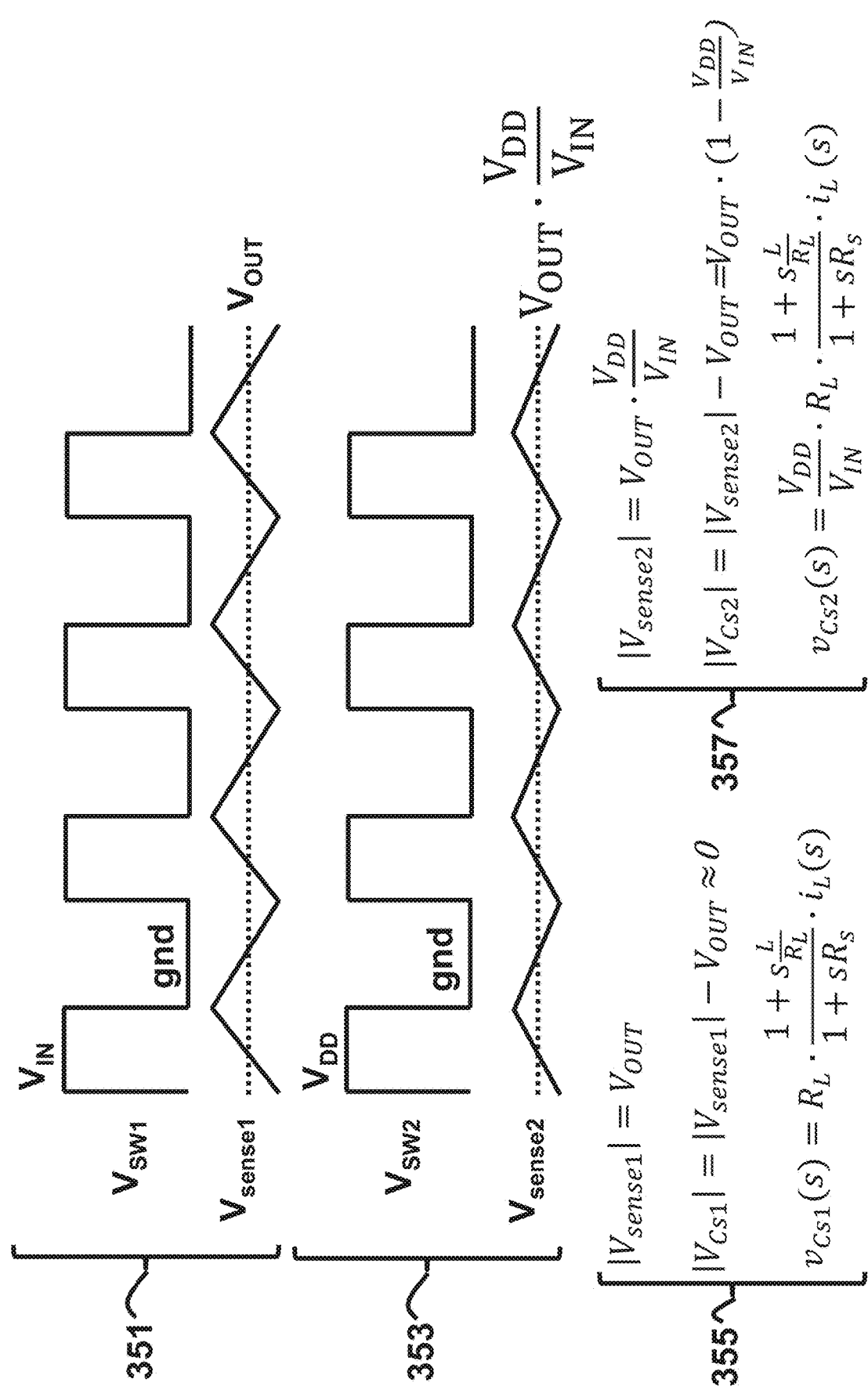
FIG. 8 illustrates exemplary voltage waveforms, and pertinent equations, in accordance with aspects of the invention.

FIG. 8 shows an illustration of the voltage waveforms of $V_{SW1}$ and $V_{sense1}$ of FIG. 1 (at 351) and $V_{SW2}$ and $V_{sense2}$ of FIG. 2 (at 353). FIG. 8 thus presents voltage diagrams depicting the change of $V_{sense1}$ and $V_{sense2}$ with input voltage. FIG. 8 also shows equations for $V_{Cs1}$ (at 355) and $V_{Cs2}$ (at 357), where $V_{Cs1}$ is the voltage across $C_{s1}$ and $V_{Cs2}$ is the voltage across $C_{s2}$. The parameters in the last line of groups of equations 355, 357 is the complex frequency from the Laplace transform.

Figure 9:
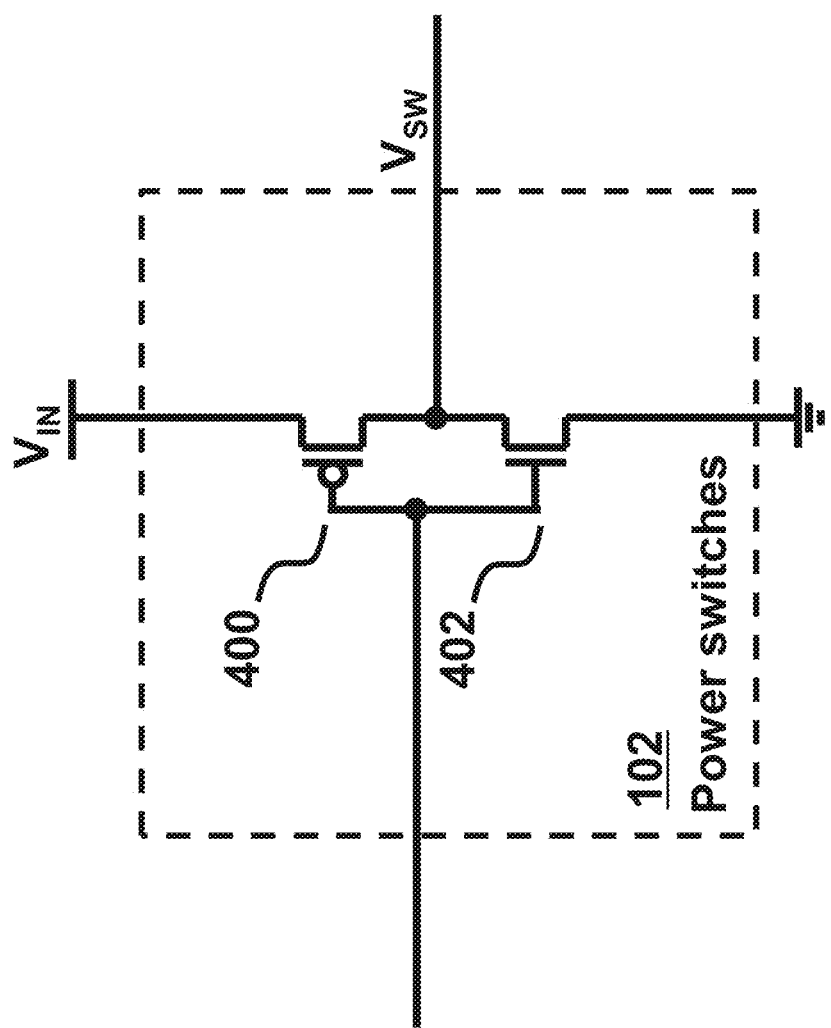
FIG. 9 shows a first non-limiting exemplary implementation of power switches, in accordance with an aspect of the invention.

FIG. 9 shows a first non-limiting exemplary implementation of the power switches 102 in FIG. 1, which could also be used as switches 202 in FIGS. 2 and 3. In particular, FIG. 9 is a buck converter with a pFET 400 and an nFET 402. The pFET 400 has a first drain-source terminal coupled to $V_{IN}$; a gate coupled to the gate of nFET 402; and a second drain-source terminal coupled to a first drain-source terminal of nFET 402 and forming the node at voltage $V_{SW}$. A second drain-source terminal of nFET 402 is grounded. The pulse width modulation signal can be applied to the gates of FETs 400, 402.

Figure 10:
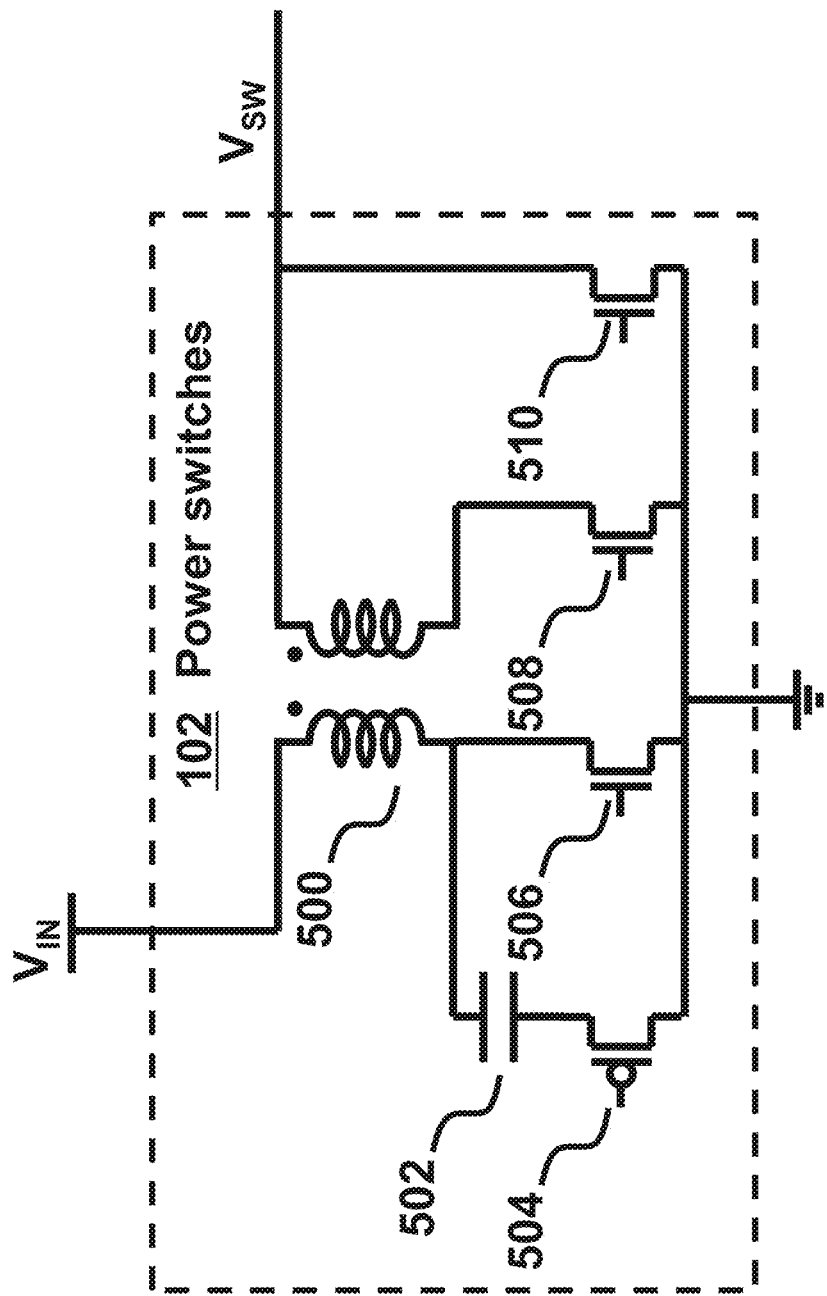
FIG. 10 shows a second non-limiting exemplary implementation of power switches, in accordance with another aspect of the invention.

FIG. 10 shows a second non-limiting exemplary implementation of the power switches 102 in FIG. 1, which could also be used as switches 202 in FIGS. 2 and 3. FIG. 10 is a forward converter including a transformer 500 (in this example, step-down), four switches 504, 506, 508, and 510 and one capacitor 502. Switch 504 is a pFET while the other three switches are nFETs. One terminal of the primary winding of transformer 500 is connected to $V_{IN}$ while the other is connected to a first drain-source terminal of switch 506, and, through capacitor 502, to a first drain-source terminal of switch 504. Second drain-source terminals of switches 504, 506 are grounded. One terminal of the secondary winding of transformer 500 is connected to $V_{SW}$ and to a first drain-source terminal of switch 510 while the other terminal of the secondary winding of transformer 500 is connected to a first drain-source terminal of switch 508. Second drain-source terminals of switches 508, 510 are grounded. The pulse width modulation signal can be applied to the gate of switch 506 and 508; the inverse of the pulse width modulation signal can be applied to the gate of switch 504 and 510.

It is to be emphasized that FIGS. 9 and 10 are non-limiting examples; any circuitry that creates $V_{SW1}$ to be applied to an inductor L as in FIGS. 2 and 3 can be used. One or more embodiments are capable of calibrating the behavior of any arbitrary collection of power switches and/or drivers. In general, the power switches and drivers box 202 will include circuitry which, for some portion of the cycle pulls $V_{SW1}$ higher, and for some portion of the cycle pulls $V_{SW1}$ lower.

One or more embodiments provide a current measurement circuit suitable for use with a switched-mode power supply. One or more embodiments measure current through the output inductor 204 of the power supply. Referring, for example, to FIGS. 2 and 3, it will be appreciated that one or more embodiments provide a switched-mode power supply wherein the controller 218 uses a virtual measurement of the current through the output inductor 204. The controller and the virtual current measurement circuitry have no direct connection to the output $V_{SW1}$ of the power switches 202. In one or more embodiments, the virtual current measurement circuitry is implemented by a series resistor $R_S$ 206, 206A and capacitor $C_{S2}$ 208, 208A. The function of the series resistor and capacitor can be integrated into the controller, as in FIG. 2, or these components can be discrete, as in FIG. 3.

In one or more embodiments, the controller 218 includes a virtual (phantom) current sense calibration circuit 222 and a closed loop control circuit 220.

In one or more embodiments of the virtual current sense calibration circuit 222, calibration routines are provided wherein several parameters (e.g. A, B, and C as seen in FIG. 5) are optimized. In one or more embodiments, the parameters include, for example, a timing parameter $t_{set}$ as discussed with regard to FIG. 6 and a drive strength parameter $r_{set}$ as discussed with regard to FIG. 7.

In some cases, the calibration is performed at the time of assembly and calibration results are stored in the device; e.g., in block 226.

In other cases, the calibration is performed in the operational hardware in the field. The calibration routine can then be run at a separate time from normal software program execution, or during normal software program execution.

Furthermore, still referring to FIGS. 2 and 3, one or more embodiments provide a switched-mode power supply including a collection of power switches 202; an output inductor 204; an output capacitor 214; a load 216; a controller 218; and a series-connected current sensing resistor $R_S$ 206, 206A and capacitor $C_{S2}$ 208, 208A. One pertinent aspect in one or more embodiments is that the current sensing capacitor and the current sensing resistor are only connected to (206A, 208A) or part of (206, 208) the controller 218, they do not have a pin/connection going to the node $V_{SW1}$. In one or more embodiments, the control circuit measures the voltage $V_{sense2}$ at the midpoint between the current sensing capacitor and the current sensing resistor.

As noted elsewhere, the function of the series resistor and capacitor can be integrated into the controller, as in FIG. 2, or these components can be discrete, as in FIG. 3.

As also noted elsewhere, in one or more embodiments, the controller 218 includes a virtual (phantom) current sense calibration circuit 222 and a closed loop control circuit 220. In one or more embodiments of the virtual current sense calibration circuit 222, calibration routines are provided wherein several parameters (e.g. A, B, and C as seen in FIG. 5) are optimized. In one or more embodiments, the parameters include, for example, a timing parameter $t_{set}$ as discussed with regard to FIG. 6 and a drive strength parameter $r_{set}$ as discussed with regard to FIG. 7.

In some cases, the calibration is performed at the time of assembly and calibration results are stored in the device; e.g., in block 226. In other cases, the calibration is performed in the operational hardware in the field. The calibration routine can then be run at a separate time from normal software program execution, or during normal software program execution.

In one or more embodiments, unlike prior art approaches, current is sensed through a phantom circuit which generates a signal to mimic the signal at the switching node. The switching node does not have a pin connected to the sensing circuit. Furthermore, in one or more embodiments, the current in an inductor is sensed, and there is no need for pins connected to the switching node or active driving node. Even further, one or more embodiments are applicable to a switched-mode power supply and do not require a so-called "replica FET (Field-Effect Transistor)."

Given the discussion thus far, it will be appreciated that, in general terms, an exemplary apparatus, according to an aspect of the invention, includes a power switch and driver block 202 having an input voltage terminal $V_{IN}$, a ground terminal, a pulse width modulation input terminal ($V_{PWM}$), and a switching node output $V_{SW1}$. Also included are an inductor 204 having an input terminal coupled to the switching node output $V_{SW1}$ and having an output terminal $V_{OUT}$; a sensing capacitor 208, 208A having a first terminal coupled to the output terminal of the inductor $V_{OUT}$ and a second, sense input terminal $V_{sense2}$; a sensing resistor 206, 206A having a first terminal coupled to the second, sense input terminal of the sensing capacitor, and a second terminal including a pulse signal node $V_{SW2}$; and a control block (e.g., 220, 222, 226). The control block has a voltage supply rail $V_{DD}$, a ground rail (e.g. grounds of 220, 222), a first input terminal coupled to the output terminal of the inductor $V_{OUT}$, a second input terminal coupled to the second, sense input terminal of the sensing capacitor $V_{sense2}$, a first output terminal coupled to the pulse signal node $V_{SW2}$, and a pulse width modulation output terminal $V_{PWM}$ coupled to the pulse width modulation input terminal of the power switch and driver block 202.

The control block includes correlative logic which generates a voltage on the first output terminal $V_{SW2}$ equivalent to a voltage of the switching node output $V_{SW1}$ so as to infer a current through the inductor 204. The control block generates a pulse width modulation signal $V_{PWM}$ on the pulse width modulation output terminal, based on the inferred current through the inductor, without a direct electrical connection between (i) the sensing capacitor 208, 208A and the sensing resistor 206, 206A, and (ii) the switching node output $V_{SW1}$ of the power switch and driver block 202. For example, elements 206, 206A, 208, 208A are connected to the output of 204 but not its input as in the analogous aspect of FIG. 1.

The control block can, for example, be implemented on an integrated circuit with the sensing capacitor and the sensing resistor implemented as discrete components, as in FIG. 3, or, for example, the control block, the sensing capacitor, and the sensing resistor can all be implemented on the same integrated circuit as in FIG. 2.

In one or more embodiments, the correlative logic includes calibration logic which optimizes a plurality of parameters of the voltage on the first output terminal. Various approaches can be taken. In some instances, this correlative logic implements routines such as are depicted in the flow charts of FIGS. 4-7 and is external to the chip; for example, is part of a test fixture including a processor which carries out the correlation and loads the results (parameters) into a memory accessible via block 226. Thus, in some instances, the calibration is performed at the time of assembly and the calibration result is stored in the device. In another aspect, test fixture functionality is built into the finished product and the test/correlation routine is carried out by logic within the controller 218. Thus, in other instances, the calibration is performed in the operational hardware in the field. In this latter aspect, the calibration routine can run during normal software program execution or at a separate time from normal software program execution. References to "normal software program execution" are pertinent to use of power supplies as disclosed herein within computers running software programs. In some cases, calibration routines as disclosed herein can be run at installation at the customer site, or every time a certain piece of code is executed by the computer including the power supply. In some cases, recalibration could even take place continuously in real-time during program execution.

The plurality of parameters of the voltage on the first output terminal that are optimized by the correlative logic can include, for example, a timing parameter $t_{set}$ and/or a drive strength parameter $r_{set}$.

In some cases, the control block includes a closed loop control circuit 220 coupled to the voltage supply rail, the ground rail, the first input terminal, the sense input terminal, and the pulse width modulation output terminal; and a phantom current sense calibration circuit 222 coupled to the voltage supply rail, the ground rail, the first input terminal, the first output terminal, and the pulse width modulation output terminal. The pulse width modulation signal is taken as an input to the phantom current sense calibration circuit. Also included is a calibration storage block 226 which stores results of the optimization of the plurality of parameters of the voltage on the first output terminal.

In some instances, as shown in FIG. 9, the power switch and driver block includes a buck converter.

In other instances, as shown in FIG. 10, the power switch and driver block includes a forward converter.

One or more embodiments further include a load 216 coupled between the output terminal of the conductor and ground; optionally with an output capacitor 214 coupled in parallel with the load between the output terminal of the conductor and ground. The load can be any type of suitable load; as noted elsewhere herein, in some instances, power supplies controlled in accordance with aspects of the invention are used in computer systems.

In another aspect, an exemplary method includes obtaining, as a first input signal to a control block, a voltage associated with an inductor 204 having an input terminal and an output terminal. The input terminal is coupled to a power switch and driver block 202 at a switching node $V_{SW1}$. The associated voltage is a voltage other than the voltage of the switching node. An additional step includes obtaining, as a second input signal to the control block, a sense input voltage $V_{sense2}$ on an output terminal of a sensing circuit that is not directly connected to the switching node. A still further step includes generating a voltage $V_{SW2}$ on a first output terminal of the control block; the generated voltage is selected so as to enable inferring a current through the inductor. An even further step includes generating a pulse width modulation signal $V_{PWM}$ on a pulse width modulation output terminal of the control block, based on the inferred current through the inductor. Yet a further step includes providing the pulse width modulation signal to a pulse width modulation input terminal of the power switch and driver block.

On or more embodiments infer inductor current based on some voltage that is simulated, not necessarily the voltage across the inductor (although that is a possibility)—voltage across block 202 could also be used, for example. This is done in one or more embodiments without having a direct connection between the sensing capacitor, the sensing resistor, and the input terminal of the inductor.

In one or more embodiments, in the step of obtaining the first input signal to the control block, the voltage associated with the inductor includes voltage $V_{OUT}$ at the output terminal of the inductor; in the step of obtaining the sense input voltage, the sensing circuit includes a sensing capacitor 208, 208A and a sensing resistor 206, 206A, the sensing capacitor has an input terminal coupled to the output terminal of the inductor and an output terminal, including the output terminal of the sensing circuit. the sensing resistor is connected between the output terminal of the sensing circuit and the first output terminal of the control block. The step of generating the voltage on the first output terminal of the control block includes generating the voltage as an equivalent of the voltage of the switching node $V_{SW1}$.

Thus, in some instances, an exemplary method includes obtaining, as an input signal to a control block (e.g., 220, 222, 226) a voltage $V_{OUT}$ of an output terminal of an inductor 204 having an input terminal coupled to a power switch and driver block 202; and obtaining, as an input signal to the control block, a sense input voltage $V_{sense2}$ on an output terminal of a sensing capacitor 208, 208A having an input terminal coupled to the output terminal of the inductor and having the output terminal coupled to a sensing resistor 206, 206A connected between the sensing capacitor and a first output terminal of the control block. Further steps include generating a voltage $V_{SW2}$ on the first output terminal of the control block equivalent to a voltage $V_{SW1}$ on the input terminal of the inductor 204 so as to infer a current through the inductor; generating a pulse width modulation signal $V_{PWM}$ on a pulse width modulation output terminal of the control block, based on the inferred current through the inductor, without a direct electrical connection between (i) the sensing capacitor and the sensing resistor, and (ii) the input terminal of the inductor; and providing the pulse width modulation signal $V_{PWM}$ to a pulse width modulation input terminal of the power switch and driver block 202.

Referring to FIGS. 4 and 5, one or more embodiments further include optimizing a plurality of parameters of the voltage on the first output terminal of the control block.

In some instances, as in FIG. 6, optimizing the plurality of parameters includes optimizing a timing parameter $t_{set}$. For example, initialize the timing parameter as in step 317; repeatedly apply a voltage on the first output terminal of the control block (e.g. $V_{SW2}$ signal) with timing corresponding to the timing parameter $t_{set}$, step a load current (through 204), and record a voltage droop in the voltage of the output terminal of the inductor (steps 319 and 321), and increment the timing parameter until a predetermined range of values for the timing parameter are completed (as per decision block 323 and step 325). Select a value for the timing parameter, within the predetermined range, which minimizes the droop, as per steps 327, 329.

In some instances, as in FIG. 7, optimizing the plurality of parameters includes optimizing a drive strength parameter $r_{set}$. For example, initialize the drive strength parameter as in step 335; repeatedly apply a voltage on the first output terminal of the control block (e.g. $V_{SW2}$ signal) with drive strength corresponding to the drive strength parameter $r_{set}$, step a load current (through 204), and record a voltage droop in the voltage of the output terminal of the inductor (steps 337 and 339), and increment the drive strength parameter until a predetermined range of values for the drive strength parameter are completed (as per decision block 341 and step 343). Select a value for the drive strength parameter, within the predetermined range, which minimizes the droop, as per steps 345, 347.

In some cases, the optimization is performed upon assembly of the control block, the inductor, the power switch and driver block, and the sensing circuit, and results of the optimization are stored in a storage accessible to the control block (e.g. 226).

In some cases, the control block, the inductor, the power switch and driver block, and the sensing circuit, are field-deployed in a computing device. the optimization is then carried out in the computing device at a separate time from normal software program execution in the computing device, or in other cases, during normal software program execution in the computing device.

Figure 11:
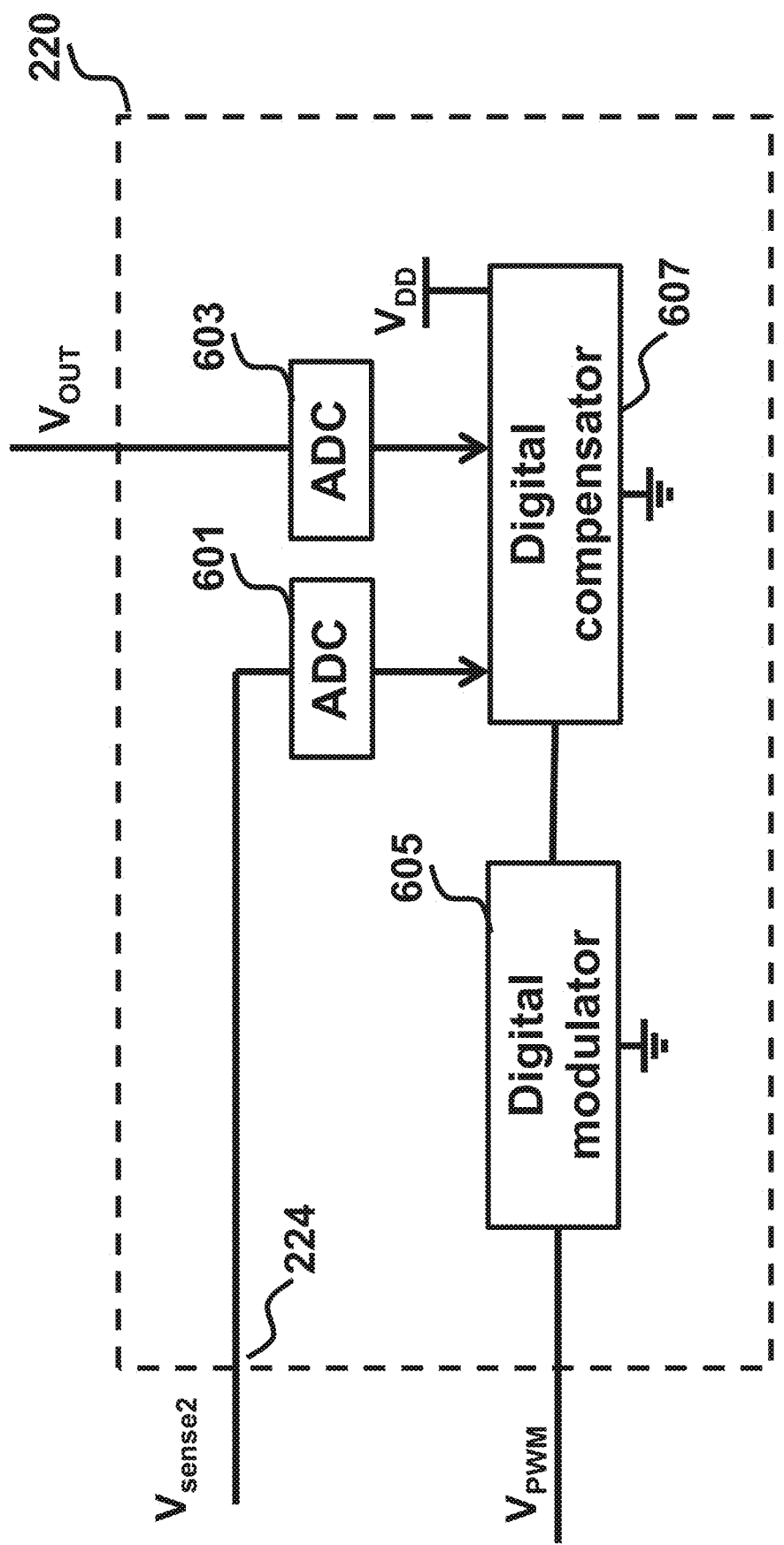
FIG. 11 illustrates one non-limiting exemplary form of closed loop control circuit, useful with one or more embodiments of the invention.

Block 222 includes, for example, digital logic circuitry implementing the calibration routines depicted in the flow charts discussed elsewhere herein, as well as suitable analog-to-digital (A/D) converters to covert the analog signals into digital signals that can be processed by the digital circuitry. Software executing on an off-chip general-purpose processor coupled to A/D converters could also be employed. Any suitable circuitry can be employed for the closed loop control circuit 220, as will be apparent to the skilled artisan give the teachings herein. By way of a first non-limiting example, as seen in FIG. 11, closed loop control circuit 220 can include an analog-to-digital (A/D)

converter 603 which converts analog voltage $V_{out}$ to digital form as an input to digital compensator 607; an analog-to-digital (A/D) converter 601 which converts analog voltage $V_{sense2}$ 224 to digital form as an input to digital compensator 607; and a digital modulator 605 coupled to compensator 607 which generates pulse width modulation signal $V_{PWM}$. Note power supply rail $V_{DD}$ and ground connections for elements 605, 607.

Figure 12:
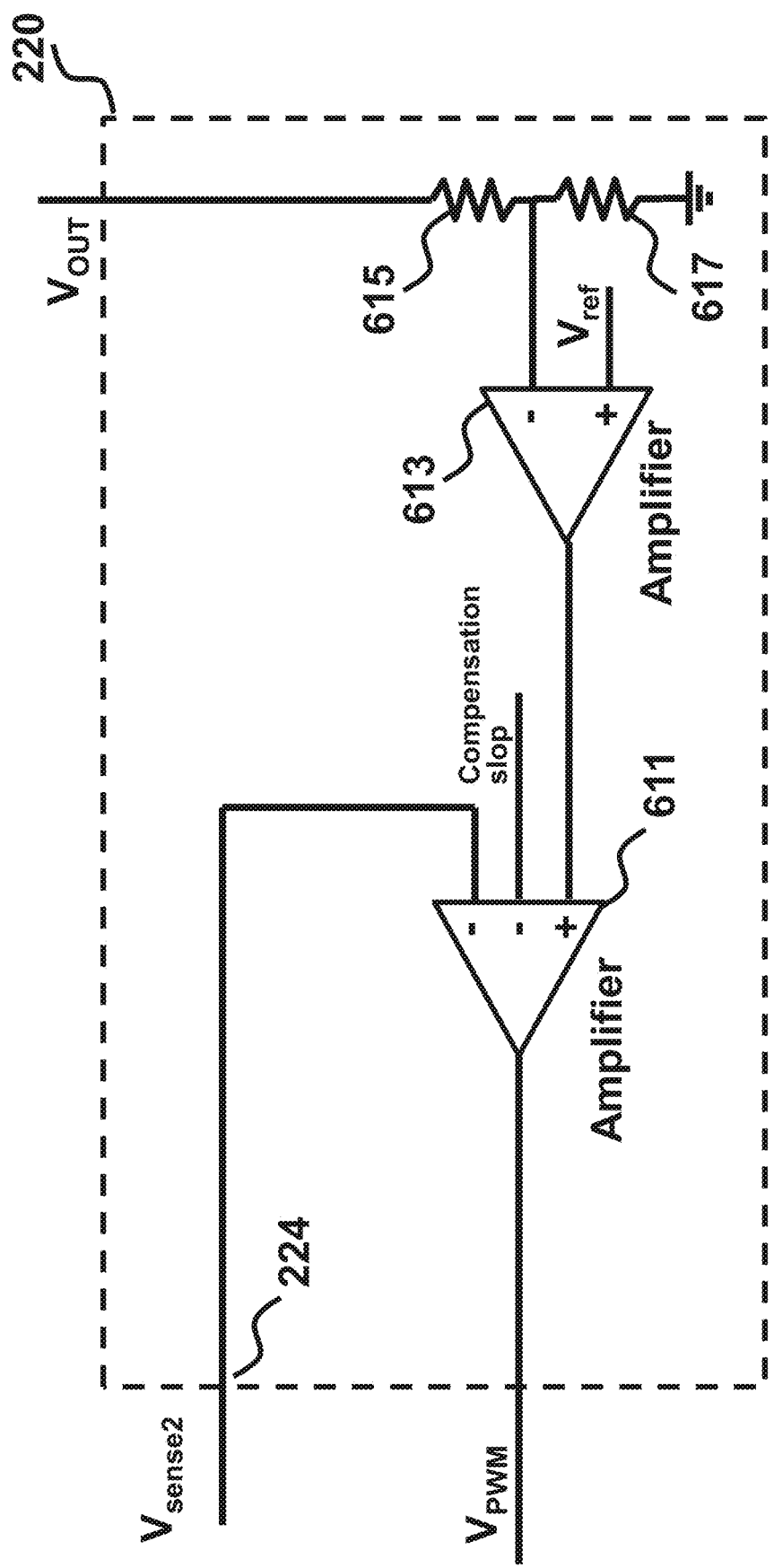
FIG. 12 illustrates another non-limiting exemplary form of closed loop control circuit, useful with one or more embodiments of the invention.

By way of a second non-limiting example, as seen in FIG. 12, closed loop control circuit 220 can include a voltage divider formed by resistors 615, 617, connected between $V_{OUT}$ and ground, the output of which is connected to the inverting input of operational amplifier (op-amp) 613. Reference voltage $V_{ref}$ is applied to the non-inverting input of op-amp 613. The output of op-amp 613 is coupled to the non-inverting input of op-amp 611. The voltage $V_{sense2}$ 224 is applied to the inverting input of the op-amp 611. A compensation slop control input is also provided. The output of the op-amp 611 is the pulse width modulation signal $V_{PWM}$.

At least a portion of the apparatus, methods and/or system described above may be implemented in an integrated circuit. In forming integrated circuits, identical dies are typically fabricated in a repeated pattern on a surface of a semiconductor wafer. Each die includes one or more devices as described herein, and may include other structures and/or circuits. The individual dies are cut or diced from the wafer, then packaged as an integrated circuit. One skilled in the art would know how to dice wafers and package die to produce integrated circuits.

Those skilled in the art will appreciate that integrated circuits embodying aspects discussed herein can be distributed in raw form (i.e., a single wafer having multiple unpackaged chips), as bare dies, in packaged form, or incorporated as parts of intermediate products or end products.

Figure 13:
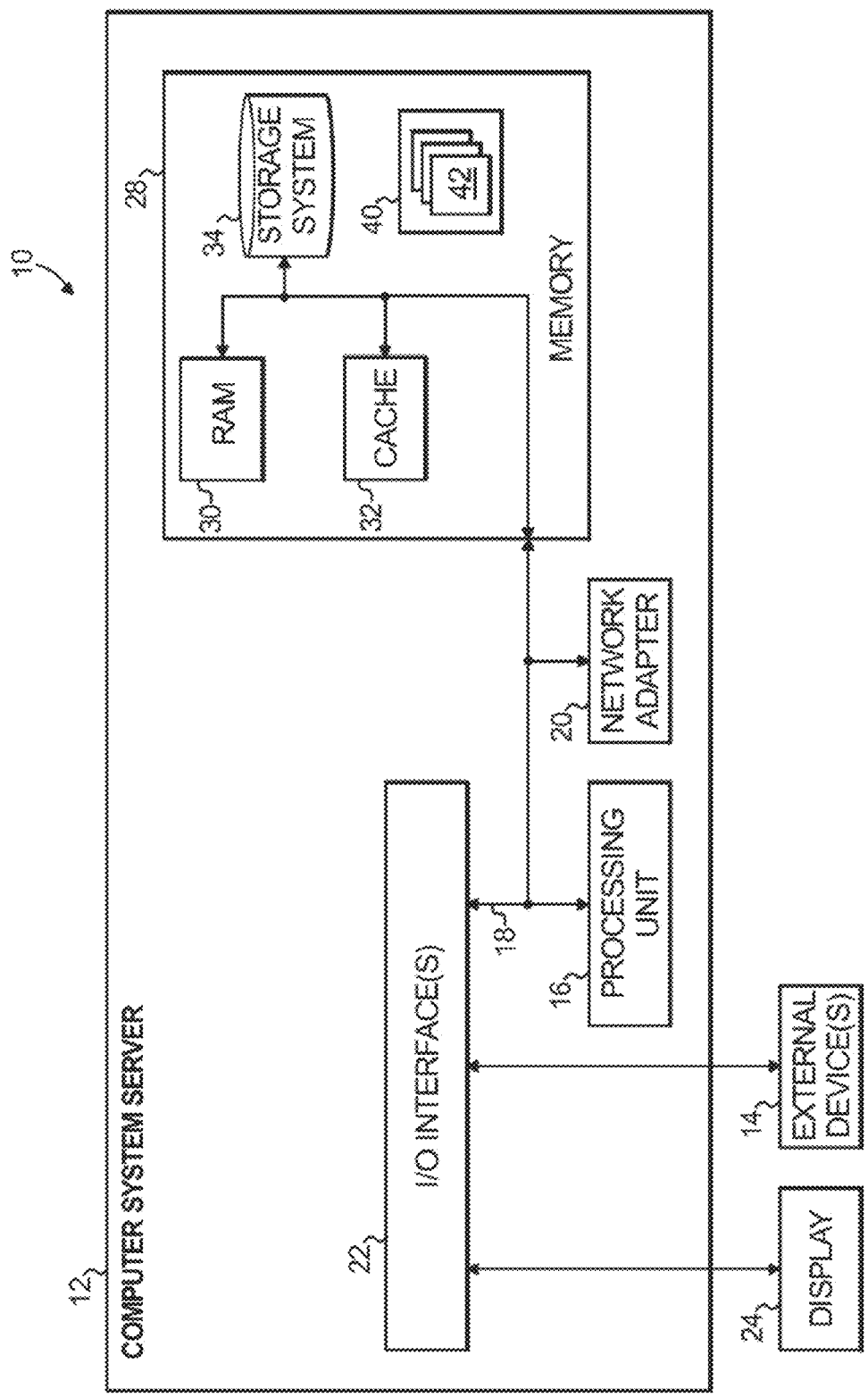
FIG. 13 depicts a computer system that may be useful in implementing one or more aspects and/or elements of the invention, and/or which can utilize a power supply in accordance with aspects of the invention.

Elements of one or more embodiments of the invention can be implemented in the form of an apparatus including a memory and at least one processor that is coupled to the memory and operative to perform exemplary method steps. For example, in some cases, a processor executing code can be used to carry out at least a portion of methods shown in FIGS. 4-7. FIG. 13 depicts a computer system 10 that may be useful in implementing one or more aspects and/or elements of the invention. Furthermore, a power supply controlled in accordance with aspects of the invention could be used within such a system. Referring now to FIG. 13, system 10 is depicted in the non-limiting exemplary form of a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation (e.g., for calibration/correlation in some instances, and/or such a computer or workstation could use a power supply controlled as described herein). With reference to FIG. 13, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 13) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described with regard to the calibration/correlation of FIGS. 5-7. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

Exemplary System and Article of Manufacture Details

This section is provided in relation, for example, to embodiments wherein at least a portion of the procedures shown in FIGS. 4-7 are carried out, at least in part, using software and a processor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:
a power switch and driver block having an input voltage terminal, a ground terminal, a pulse width modulation input terminal, and a switching node output;
an inductor having an input terminal coupled to said switching node output and having an output terminal;
a sensing capacitor having a first terminal coupled to said output terminal of said inductor and a second, sense input terminal;
a sensing resistor having a first terminal coupled to said second, sense input terminal of said sensing capacitor, and a second terminal comprising a pulse signal node;
a control block having a voltage supply rail, a ground rail, a first input terminal coupled to said output terminal of said inductor, a second input terminal coupled to said second, sense input terminal of said sensing capacitor, a first output terminal coupled to said pulse signal node, and a pulse width modulation output terminal coupled to said pulse width modulation input terminal of said power switch and driver block, said control block comprising correlative logic which generates a voltage on said first output terminal equivalent to a voltage of said switching node output so as to infer a current through said inductor, said control block generating a pulse width modulation signal on said pulse width modulation output terminal, based on said inferred current through said inductor, without a direct electrical connection between (i) said sensing capacitor and said sensing resistor, and (ii) said switching node output of said power switch and driver block.

2. The apparatus of claim 1, wherein said control block is implemented on an integrated circuit and said sensing capacitor and said sensing resistor are implemented as discrete components.

3. The apparatus of claim 1, wherein said control block, said sensing capacitor, and said sensing resistor are implemented on an integrated circuit.

4. The apparatus of claim 1, wherein said correlative logic includes calibration logic which optimizes a plurality of parameters of said voltage on said first output terminal.

5. The apparatus of claim 4, wherein said plurality of parameters of said voltage on said first output terminal optimized by said correlative logic comprise a timing parameter.

6. The apparatus of claim 4, wherein said plurality of parameters of said voltage on said first output terminal optimized by said correlative logic comprise a drive strength parameter.

7. The apparatus of claim 4, wherein said control block comprises:
   a closed loop control circuit coupled to said voltage supply rail, said ground rail, said first input terminal, said sense input terminal, and said pulse width modulation output terminal;
   a phantom current sense calibration circuit coupled to said voltage supply rail, said ground rail, said first input terminal, said first output terminal, and said pulse width modulation output terminal, said pulse width modulation signal being taken as an input to said phantom current sense calibration circuit; and
   a calibration storage block which stores results of said optimization of said plurality of parameters of said voltage on said first output terminal.

8. The apparatus of claim 1, wherein the power switch and driver block comprises a buck converter.

9. The apparatus of claim 1, wherein the power switch and driver block comprises a forward converter.

10. The apparatus of claim 1, further comprising a load coupled between said output terminal of said conductor and ground.

11. A method comprising:
   obtaining, as a first input signal to a control block, a voltage associated with an inductor having an input terminal and an output terminal, the input terminal being coupled to a power switch and driver block at a switching node, the associated voltage being other than a voltage of said switching node;
   obtaining, as a second input signal to said control block, a sense input voltage on an output terminal of a sensing circuit that is not directly connected to said switching node;
   generating a voltage on a first output terminal of said control block, said generated voltage being selected so as to enable inferring a current through said inductor;
   generating a pulse width modulation signal on a pulse width modulation output terminal of said control block, based on said inferred current through said inductor; and
   providing said pulse width modulation signal to a pulse width modulation input terminal of said power switch and driver block.

12. The method of claim 11, wherein:
   in said step of obtaining said first input signal to said control block, said voltage associated with said inductor comprises voltage at said output terminal of said inductor;
   in said step of obtaining said sense input voltage, said sensing circuit comprises a sensing capacitor and a sensing resistor, said sensing capacitor having an input terminal coupled to said output terminal of said inductor and an output terminal, comprising said output terminal of said sensing circuit, said sensing resistor being connected between said output terminal of said sensing circuit and said first output terminal of said control block; and
   said step of generating said voltage on said first output terminal of said control block comprises generating said voltage as an equivalent of said voltage of said switching node.

13. The method of claim 12, further comprising optimizing a plurality of parameters of said voltage on said first output terminal of said control block.

14. The method of claim 13, wherein optimizing said plurality of parameters comprises optimizing a timing parameter.

15. The method of claim 14, wherein optimizing said timing parameter comprises:
   initializing said timing parameter;
   repeatedly applying a voltage on said first output terminal of said control block with timing corresponding to said timing parameter, stepping a load current, recording a voltage droop in said voltage of said output terminal of said inductor, and incrementing said timing parameter until a predetermined range of values for said timing parameter are completed; and
   selecting a value for said timing parameter, within said predetermined range, which minimizes said droop.

16. The method of claim 13, wherein optimizing said plurality of parameters comprises optimizing a drive strength parameter.

17. The method of claim 16, wherein optimizing said drive strength parameter comprises:
   initializing said drive strength parameter;
   repeatedly applying a voltage on said first output terminal of said control block with drive strength corresponding to said drive strength parameter, stepping a load current, recording a voltage droop in said voltage of said output terminal of said inductor, and incrementing said drive strength parameter until a predetermined range of values for said drive strength parameter are completed; and
   selecting a value for said drive strength parameter, within said predetermined range, which minimizes said droop.

18. The method of claim 13, wherein said optimization is performed upon assembly of said control block, said inductor, said power switch and driver block, and said sensing circuit, and wherein results of said optimization are stored in a storage accessible to said control block.

19. The method of claim 13, wherein said control block, said inductor, said power switch and driver block, and said sensing circuit, are field-deployed in a computing device, and wherein said optimization is carried out in said computing device at a separate time from normal software program execution in said computing device.

20. The method of claim 13, wherein said control block, said inductor, said power switch and driver block, and said sensing circuit, are field-deployed in a computing device, and wherein said optimization is carried out in said computing device during normal software program execution in said computing device.

\* \* \* \* \*